Aug. 5, 1941.  C. D. WILLSON  2,251,698
ROAD VEHICLE CONSTRUCTION
Filed April 6, 1939  3 Sheets-Sheet 1
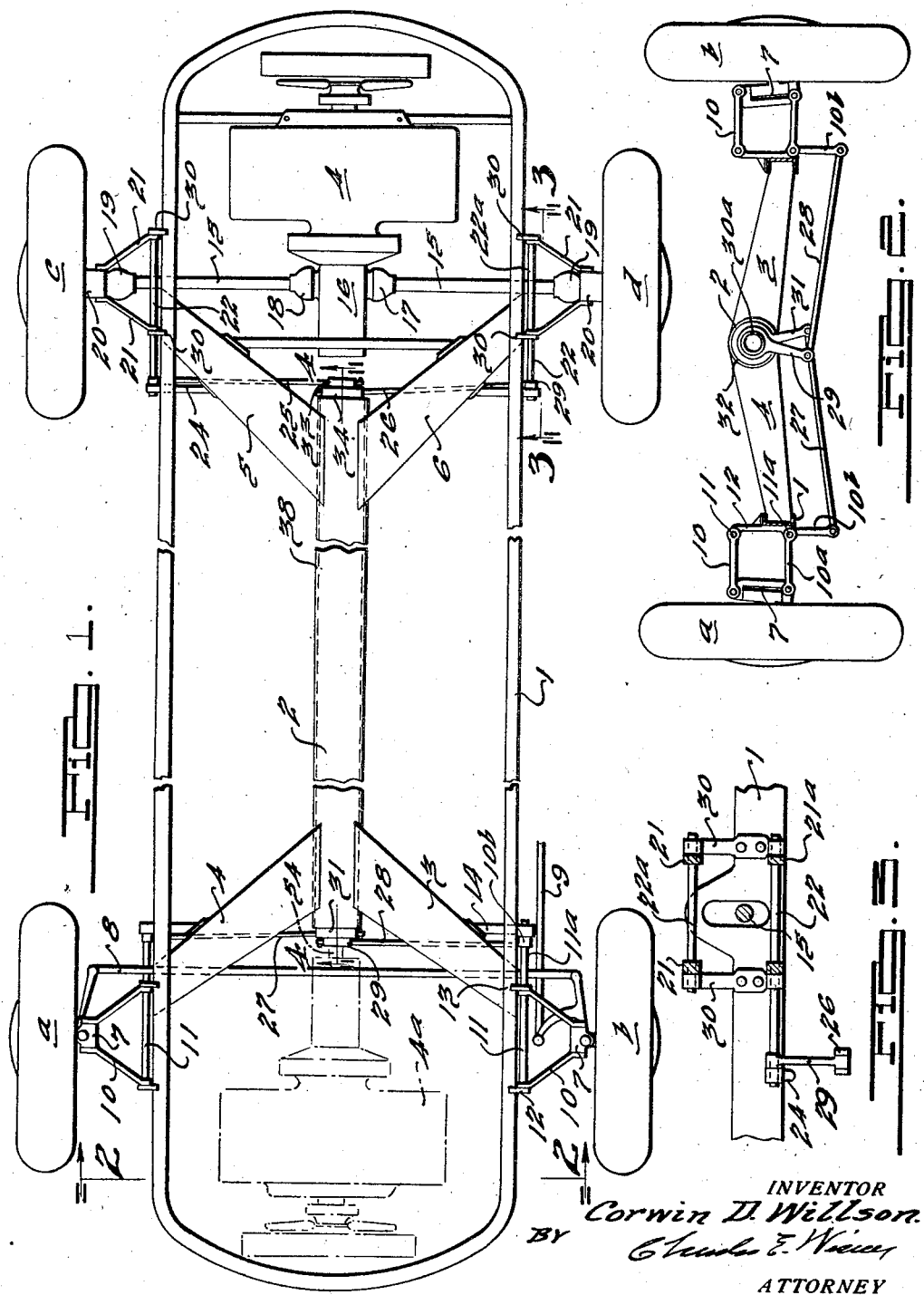
INVENTOR
Corwin D. Willson.
BY
ATTORNEY

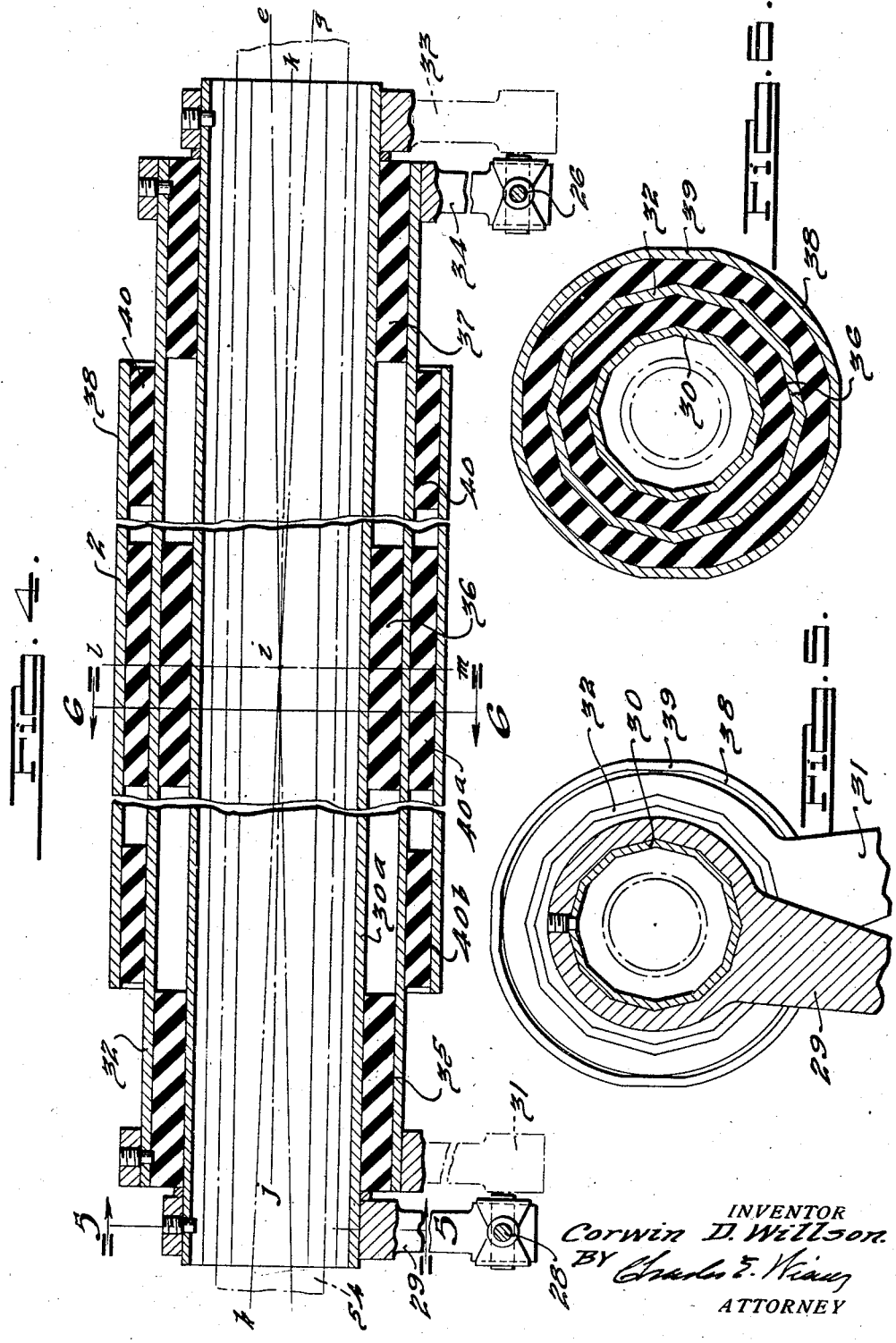

Aug. 5, 1941.   C. D. WILLSON   2,251,698
ROAD VEHICLE CONSTRUCTION
Filed April 6, 1939   3 Sheets-Sheet 3
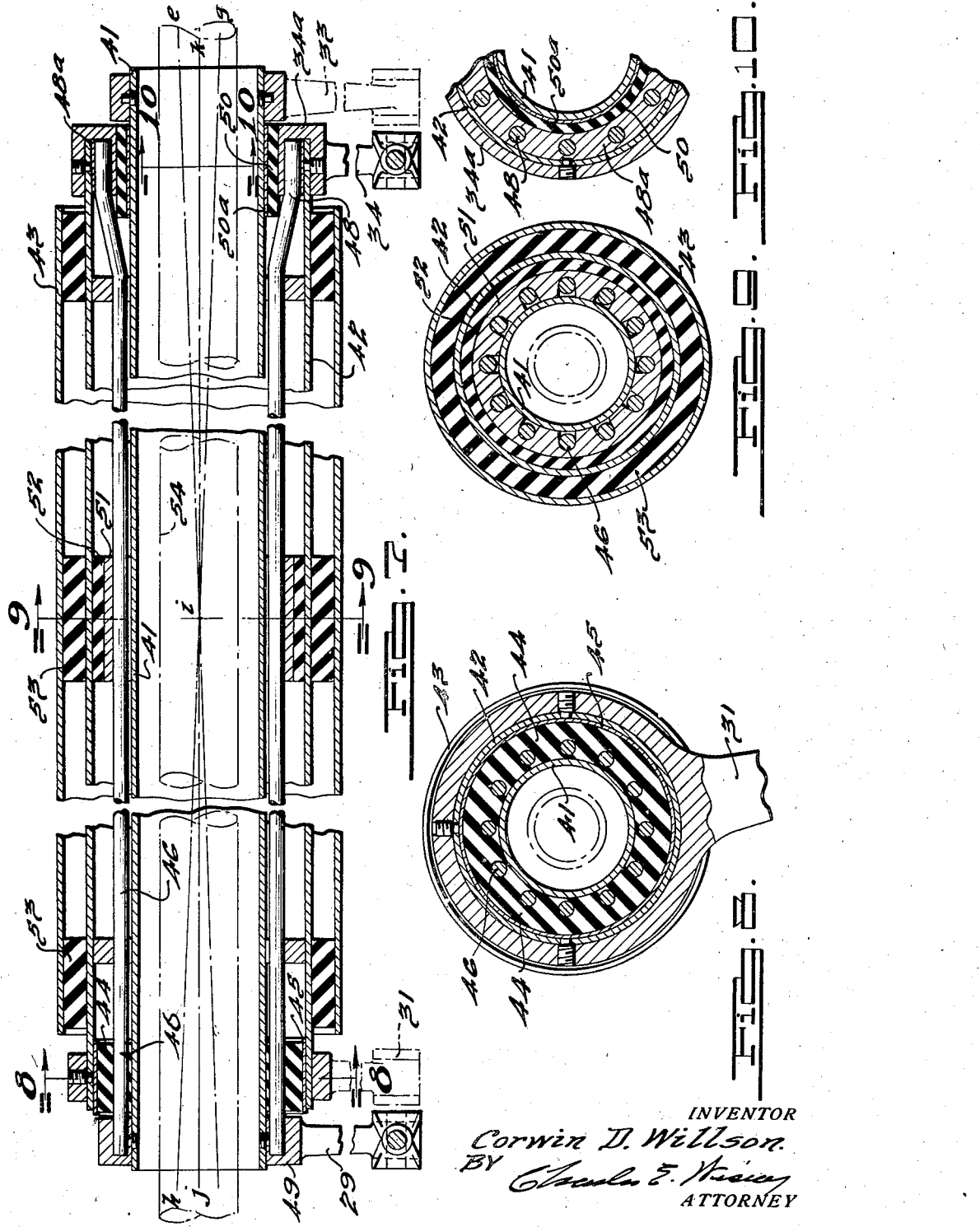
INVENTOR
Corwin D. Willson.
BY
ATTORNEY Patented Aug. 5, 1941

2,251,698

UNITED STATES PATENT OFFICE 2,251,698

ROAD VEHICLE CONSTRUCTION

Corwin D. Willson, Flint, Mich.

Application April 6, 1939, Serial No. 266,371

8 Claims. (Cl. 280—124)

This invention relates to road vehicle construction, more particularly to the suspension means between the body of the vehicle and the road wheels.

A principal object of the invention is to provide a suspension means in a single composite structure to which all of the road wheels are connected and on which the body of the vehicle is mounted, the suspension device being of such character of construction that displacement of any of the wheels in a vertical plane in traversing an uneven surface is transmitted to the several wheels and so reacts upon the body as to maintain its base substantially in a plane normal to the road surface.

It is further an object and feature of the invention to provide a vehicle body suspension means formed of cooperative parts in a unitary structure and in which movement of a wheel or wheels in a vertical plane relative to another wheel or wheels is resisted by a resilient means providing a component of the suspension device and in which the shock of vertical displacement of a wheel in traversing a road surface is transmitted to a wheel on the opposite side of the vehicle body, each front wheel of a four wheeled vehicle being directly connected with a rear wheel on the respective opposite side of the body, and associated with which is means resiliently cushioning side thrust due to road shock.

In previous vehicle body suspension means, the load which includes a body, or the usual vehicle chassis frame in motor vehicle construction, the frame or body is usually supported by springs at four points and independently yieldable to road shock upon the respective wheels but the springs in such previous constructions are of a certain stiffness required to support the load and thus prevent ready response to vertical movement of the road wheels and therefore do not properly cushion the shock and also which tend to deflect the body at point adjacent the wheels which results in a rolling or pitching of the body and further require shock absorbers to prevent too rapid and strong spring reactions.

My improved suspension means distinguishes from such previous construction in that the weight of the vehicle is not supported directly by the springs and the springs are caused to act principally through relative displacement of a wheel or wheels in a vertical plane.

As hereinafter more fully described, my improved vehicle body suspension means is substantially counter-balanced on the point of intersection of the longitudinal and transverse axes of the body movement, a front and rear wheel on one side and the respective opposite front and rear wheels providing pairs in which the wheels are directly connected one with the other, and a resilient means is incorporated therewith tending to yieldably resist movement of the connecting means of either or both pairs by vertical and/or horizontal displacement of the connected wheels.

These and other objects and novel features of the invention are hereinafter more fully described and claimed, and the preferred form of construction of a suspension means for a vehicle chassis or body is shown in the accompanying drawings in which—

Fig. 1 is a plan view of the chassis frame or body and suspension means between the chassis frame and the wheels.

Fig. 2 is an elevation of the front road wheel assembly showing a portion of the chassis frame in section and the mounting of the wheels relative to the frame.

Fig. 3 is a section taken on line 3—3 of Fig. 1, showing generally the character of the pivotal connection of the chassis frame with the wheels permitting movement of the wheels relative to the chassis frame in a vertical plane.

Fig. 4 is a central longitudinal section of my improved suspension device.

Fig. 5 is a section taken on line 5—5 of Fig. 4.

Fig. 6 is a section taken on line 6—6 of Fig. 4.

Fig. 7 is a longitudinal section of an alternative form of the suspension device.

Fig. 8 is a section taken on line 8—8 of Fig. 7.

Fig. 9 is a section taken on line 9—9 of Fig. 7.

Fig. 10 is a section taken on line 10—10 of Fig. 7.

The preferred construction of a suspension means for the purpose stated is shown in plan view in Fig. 1 in which the chassis frame is indicated at 1, which frame may be of any of the usual forms commonly in use in automotive construction. This frame may be of any desired character as may be determined by the body or character of structure that is to be supported and the term "chassis frame", as herein used, is intended to include any desired character or shape of the lower portion of the body or the supported load and thus while such a frame is used in automotive vehicle construction, the invention is not confined to a frame as an element apart from the body or supported load. To the frame, as here shown, is rigidly secured my load suspension means shown in plan view at 2 which is preferably of tubular form in the structure here shown. This member is connected by rigid arms 3 and 4 to opposite side rails of the chassis frame at the forward end of the member 2 and at the rear end of the said member is connected by similar rigid arms 5 and 6 to the rear frame, these arms being here shown as respectively connected with the chassis frame near the point of connection of the respective front and rear wheels.

I have indicated diagrammatically a power plant at 4 shown in full lines at the rear of the chassis but the power plant may be located at the front end as shown by the dotted lines at 4a.

In the automotive vehicle construction here shown, each of the front road wheels are pivotally supported on the chassis frame. The front wheels a and b are each pivoted to the respective blocks 7 for turning on an approximately vertical axis as is usual in front wheel construction, the usual tie rod 8 being connected with both the wheels to simultaneously turn the same in like directions about a vertical axis. The operating arm or pitman 9 is connected with the well known steering mechanism of the vehicle (not shown). The respective blocks 7 are supported at the outer ends of a pair of upper arms 10 and a pair of lower arms 10a which are pivoted to each block 7. The inner ends of the two arms 10 are respectively pivoted to the upper end of the bracket pieces 12 and 13 by means of a rod 11 while the lower arms 10a are pivoted to the brackets 12 and 13 by a rod 11a to which the lower arms are fixed. Also fixed to this rod 11a is a depending arm 10b as will be understood from Fig. 2. The rod 11a extends rearwardly of the fixed bracket 13 and has its end pivoted in a bracket 14 as shown in Fig. 1. Each of the wheels is mounted in similar bracket elements and the depending arm 10b of the wheel a has a link 27 connected therewith while the wheel b has a similar link 28 connected with the corresponding depending arm 10b whose function is hereinafter described.

The rear axle, here shown as being the driving axle 15, is connected with a driving means 16 of the power plant and universal couplings are provided at 17 and 18 adjacent the driving means 16 and each outer end of the driving axle is connected by a universal joint 19 with the wheel spindles which are rotatable in a housing element 20 provided for each of the rear wheels. To this housing 20 is pivotally secured the upper bracket arms 21 similar to the arms 10 of the front wheels and these bracket arms are pivoted at their opposite ends to a rod 22a supported by brackets 30 secured to the chassis frame as shown in Fig. 3. The rods 22 of each rear wheel bracket to which the lower bracket arms 21a are fixed extend forwardly of the rear axle and are supported by brackets 24 in fixed relation with the chassis frame in the same manner as the rods 11 of the front wheel mounting. The arrangement of the rear wheel structure described permits variation in a vertical plane of the rear wheel relative to the chassis frame and movement of either of the said wheels in a vertical plane turns either or both the rods 22, depending upon the wheel displacements relative to the chassis frame. The rods 25 and 26 of the respective rear wheel mountings are connected with the rear end of my suspension means while the rods 27 and 28 of the front wheel mounting are respectively connected with the rods 11a and at the inner ends to the suspension element as will be hereinafter understood.

The purpose of the rods 25, 26, 27, 28 is to cause a relative movement of one or more parts of the suspension device and displacement of one wheel transmits the strains to all the wheels which, as hereafter shown, will equalize the forces applied to the chassis frame and prevent sudden displacement of one portion of the frame to other portions prevents fore and aft pitching and transverse rolling of the vehicle body so undesirable to the occupants thereof.

In Fig. 3 is shown the rear wheel mounting in which the rod 26 is connected to an arm 29 which in turn is fixed to the rod 22 which is supported on the chassis frame by the fixed brackets 30 on the opposite sides of the rear axle portion 15 and these brackets 30 at the upper end carry a rod 22a with which the members 21 of the rear wheel brackets are pivoted. The rear wheel mountings are of the general character illustrated in Fig. 2 is which the front wheel mountings are shown.

It will be understood from the foregoing description, that each of the four wheels are pivotally mounted on the frame by means of a bracket having the parallel pivoted arms like 10a and 10b of Fig. 2 showing the front wheel mounting, the rear wheels having the upper arms 21 and the lower similar arms 21a pivoted to the same bracket 30 and this bracket structure or arrangement permits the wheels to raise or lower in a substantially vertical plane. The front wheel brackets each have a shaft 11a to which both the arms 10a and 10b are attached and form a bell crank. The arm 10b is connected with the rod or link 27 on the left side of Fig. 2 while the similar link 28 is likewise connected with the other front wheel having the same bracket arrangement.

The rods or links 25 and 26 of the rear wheel mounting have the same general arrangement and are connected to the suspension member 2 in a similar way as will be understood from Fig. 4. In this figure, the forward end of the suspension means has the link 28 connected at its inner end to a lever 29 which has an eyed end secured to an inner tube 30a of the suspension means while the link 27 of the front wheel assembly is attached to a similar lever 31 which has an eyed end secured to a tube 32 of the suspension device concentric with the tube 30a. These two levers 29 and 31 normally occupy the position indicated in Fig. 2 and any change in the vertical position of either front wheel tends to turn the levers on the central axis of the suspension means and thus rotate the respective tubes. In the rear wheel assembly, the wheel c has the link 25 connected to a lever 33 having an eyed end attached to the tube 30a to which the opposite front wheel b is connected by the lever 29. The rear wheel d has its link 26 connected to a lever 34 having an eyed end secured to an end of the tube 32 to which the opposite front wheel a is attached by the link 27 connected to the lever 31. In this arrangement, it will be seen that if the wheel b rides over a bump in the road, the tube 30a is turned in an anti-clockwise direction and at its opposite end, to which the link 25 of the rear wheel c is connected, tends, through the bracket arrangement 21, to apply force downwardly on the wheel c and upwardly on the frame at an adjacent point due to the leverage exerted at that point with the wheel as a fulcrum. Thus firstly, the road shock on a front wheel a or b and the leverage reaction is to raise the chassis frame adjacent the relatively oppositely disposed wheel d or c.

Therefore, the tendency of the chassis frame to twist by the raising of the front wheel b is counter-acted simultaneously by the pressure tending to raise the chassis wheel adjacent to the rear wheel c. The frame therefore tends to remain level which prevents rolling of the vehicle due to such shock. If the wheel b drops into a depression in the road surface, the tube 30ª tends to be turned in a clockwise direction and the chassis frame adjacent the wheel b tends to be lowered and the connected rear wheel c, which is moved by the link 25 under the condition stated, tends to be raised, the result of which is to cause the frame adjacent the rear wheel c to be lowered. It will therefore be seen that the tendency of the chassis frame to be twisted by change in position of any of the wheels in a vertical plane is counteracted by compensating action of the suspension structure as a whole and therefore that the vehicle body is not subjected to pitching and rolling as is the case with the spring structures ordinarily used in automobile body suspension. It will be observed from this arrangement, particularly as shown in Fig. 4, that variation in position of a left front wheel b tends to turn the tube 30ª and apply a like force to the opposite rear wheel c and that the tube 32 to which the front wheel a is attached at one end and the rear wheel d attached at the other by the similar linkages also tends to turn on its longitudinal axis which coincides with the longitudinal axis of the tube 30ª. The tube 32 is greater in diameter than the tube 30 and these tubes are spaced by rubber elements 35, 36 and 37.

The tubes are shown in section in Fig. 6 as being non-circular and provided with flat surfaces here shown as being twelve in number and may, if desired, be more or less. The rubber 36 between the tubes 30 and 32 tends to resist the turning of the tubes relative one to the other or, in other words, provide a resilient means between the tubes that is brought into play upon displacement of one wheel in a vertical plane relative to one or more or other wheels and this movement being adjacent the axis of movement of the levers 29, 31, 33 and 34 is sufficiently limited to be resisted by the compressibility of the rubber elements both in the rotary and lateral movements of the tubular parts.

The two tubes 30ª and 32 to which the wheels are connected, as hereinafter stated, have coinciding longitudinal axes and are separated by rubber elements or bushings and the outer casing 38 of the suspension element is of greater diameter than the tube 32 and has its longitudinal axis coinciding with the common axis of the other tubes and is spaced from the tube 32 by rubber elements 40, 40ª and 40ᵇ. The tube 38 has the arms 3, 4, 5, 6 rigidly attached thereto, so that the vehicle load is directly supported by the tube 38. The function of the resilient members is to resist rotation of the tubes 30 and 32 as heretofore described and also have the function of cushioning the lateral movement of the supported frame or body so that the longitudinal axes of said tubes may lie at an angle indicated by the dotted lines e, f or g, h in either Fig. 4 or 7 for example. These lines cross at the point i of intersection of the normal longitudinal axial line j, k and transverses line l, m of the suspension unit.

The lateral movement of the tubes 30ª and 32 results from road shock. For instance, the wheel b in an up and down movement due to road shock through its linkage, including the link 28, applies a transverse thrust as well as rotative impulse to the tube 30ª. This movement resisting means, as for instance the rubber elements in Fig. 4, therefore resists both lateral and rotative movements. The rubber element 36 of Fig. 4 is centered on the respective longitudinal and transverse axes j, k and l, m and therefore there is a counter-balancing of the paired wheels by the movement resistant element 36 and also on the similar movement resisting elements 40 and 40ª between the tube 32 and 38. It is thus evident that road shocks due to vertical displacement of the wheels, which have a tendency to distort the chassis frame or body supported by the tube 38 are counteracted through the paired wheels and as these vertical movements tend to produce side thrust, lateral movements are likewise "damped" out. Due to the resilient means of either Fig. 4 or Fig. 7 being so close to the axis of movement of the arms 29, 31, 33 and 34, the resilient means is capable of absorbing, resisting or "damping" out many of the vibrations through shock applied in different directions and varying pressures and conditions arising from shock to the four wheels which center at the intersection of the transverse and longitudinal axes of the suspension units. My improved system of suspension therefore tends to iron out or equalize the varied high frequency vibrations which by previous suspension means tend to be imposed upon the load element here indicated as a chassis frame.

There is an alternative suspension structure indicated in Fig. 7 functioning in like manner, it having the same arrangement of the arms 29 and 33 attached to the central tube 41 and the arms 31 and 34 attached to the tube 42 and also has an outer casing 43 to which the arms 3, 4, 5 and 6 are secured in the manner indicated in Fig. 1. In this arrangement of the parts, the rubber element 44, as shown in Fig. 8, has an encasing metal ring 45 mounted in the tube 42 and is apertured to receive the ends of spring rods 46. The rods 46 are shown in Fig. 7 as extending longitudinally of the device and have opposite ends 48 offset in the construction here shown, which offset ends lie loosely in an element 48ª, preferably of rubber, in the recessed hub and 34ª of the lever 34. The ends 46 of the rods 47 loosely engage in apertures provided in the eyed end 49 of the arm 29. The rubber element 44 has the metal tube 45 between it and the tube 42 and the rubber element 50 has the thin metal plate 50ª between it and the tube 41. Thus the rubber element 44 may turn on the axis of the tube 41 through actuation of the arm 29 or 33 and rotation of the tube 41. Rotation of the arm 31 or 34 and the tube 42 relative to the tube 41 will turn the ends 48 of the rods and cause the same to turn spirally about the tube 41.

The rods 46 are supported centrally by a notched metal ring member 51, shown in Fig. 9, and which is supported by a rubber ring 52 between the ring member 51 and the inner surface of the tube 42. The tube 43 is supported on the tube 42 by rubber inserts 53 on which there may be a number as indicated, a central one being centered on the longitudinal and transverse axes. With this arrangement, rotation of the arm 29 tends to turn the tube 41 and also the arm 33 but the resistance to rotation is by means of the spring rods 46 which assume a spiral form and resist rotation by the bending stress while the arms 31 and 34 have the same function. The same resultant action provided by the structure shown in Fig. 7 is secured by the structure shown in Fig. 4 in that the stress imposed by any one wheel are transmitted to the opposite rear wheel and to some degree to the other front and rear wheels due to all being connected together by resilient means in both the forms shown and under which condition the resilient means is brought into play by displacement of any one or more of the wheels relative to the others in a vertical plane and in either case, as previously stated, when the load is evenly distributed on wheels resting upon a level surface, the reactions are equal and any relative displacement of the wheels or displacement of load to provide a distribution tending to deflect the frame at one corner or one end tends to bring the spring element into play.

The inner tube 30ª or 41 in either of the structures may conveniently provide a housing for a propeller shaft 54 of an engine indicated at 4 or 4ª.

The tubular members 30ª and 32 as shown in Fig. 4 and 41 and 42 as shown in Fig. 7 are respectively attached to oppositely disposed front and rear wheels and provide a rigid connection therebetween of a character to prevent twisting of the tubes spirally about their longitudinal axes and the tendency of the tubes to rotate through displacement of any wheel connected therewith is resisted by compressible and resilient means such as the rubber elements 35, 36, 37, 40, 40ª and 40ᵇ of Fig. 4 or by the bending stresses of the rods 46 of Fig. 7 which tend to be turned spirally about the longitudinal axis of the suspension member but are free to turn on their respective axes and thus torsional stresses are absent in these rods. It is further pointed out that the rubber elements 44 and 50 are held in respect to a tube by a brass member 45 for the rubber element 44 and a similar element 50ª for the rubber element 50. Thus these rubber elements 44 and 50ª may rotate in respect to the tubes but nevertheless function to absorb transverse shocks due to relative displacement of the tubes 41 and 42 angularly about the point i. The displacement of the wheels in vertical plane is therefore resisted by a spring means, such spring means being yieldable and compressible rubber elements of Fig. 4 and both the rubber elements and the rods of Fig. 7 and it is possible to utilize such elements in the relationship stated due to the location of the suspension member on the longitudinal center plane of the chassis where rotary movement of the tubular members is at a minimum.

The rotary movement being spring resisted as stated provides for an easy riding vehicle particularly due to the fact that the pressures transmitted to the chassis frame through the varying displacements of the several road wheels are equalized and tend to prevent angular displacements of the chassis frame relative to normal due to irregularities in the road surface.

As previously stated, the suspension device described is positioned on approximately one axis of the turning movement of the chassis and counter-balanced on approximately the other axis of the turning movement of the chassis. The stresses set up in the extremities of the suspension means tend to neutralize one another at this intersection of the longitudinal and transverse axes of the chassis movement which consequently is the point of minimum movement. The resilient means being positioned at or closely adjacent to this point of minimum movement is therefore so positioned as to resist any tendency of displacement of the wheels or chassis relative to one another within the limits of minimum space and time.

The drawings are more or less diagrammatic in character, and it is to be observed that various changes in the form of the brackets for instance, or other parts of the mechanism may be made without departing from the spirit and scope of the invention as set forth in the appended claims.

Having thus fully described my invention, its utility and mode of operation, what I claim and desire to secure by Letters Patent of the United States is:

1. In a motor vehicle, a pair of front and a pair of rear road wheels, the wheels of each pair being pivotally connected to opposite sides of the body, a suspension means comprising a tubular member having its longitudinal axis in a vertical plane passing through the longitudinal center line of the body, means rigidly connecting the said tubular member to the body, a pair of rotatable elements extending longitudinally within the tubular member, one of the rear wheels being connected with an end of one of said rotatable elements and the other rear wheel being connected with an end of the other element, and each front wheel being connected with the end of the rotatable element to which the diagonally opposite rear wheel is connected, means in the connection of each of the wheels with the respective rotatable element whereby displacement of any one wheel of the two pairs of wheels in a vertical plane tends to relatively displace the diagonal opposite wheel of the other pair in the opposite direction in a vertical plane, and resilient means within said housing yieldably resisting rotation of either of the elements therein by displacement of a road wheel in a vertical plane relative to the body.

2. In a motor vehicle, a body, a pair of front and a pair of rear road wheels, the wheels of each pair being pivotally connected to opposite sides of the body to turn on an axis parallel with the longitudinal center line of the body, a suspension means comprising a frame including a tubular member extending longitudinally of the frame with its longitudinal axis in a vertical plane passing through the longitudinal center line of the body, a pair of forward and a pair of rear arms rigidly connecting the said tubular member to the opposite sides of the body at points respectively adjacent the point of connection of the front and rear road wheels thereto, a pair of rotatable elements of tubular form, one lying within the other with the axes thereof coinciding with the axis of the tubular member, each rear wheel being connected with the rotatable element with which the diagonally opposite front wheel is connected, the said connection comprising an arm for each wheel attached to the end of the respective tubular member, the arm for a front wheel of the diagonal pair extending at an angle to the vertical center plane of the tubular member and the arm connecting the diagonally opposite rear wheel to the said rotatable element lying at a similar angle on the opposite side of the said center plane of the rotatable member, whereby displacement of a wheel of a connected pair relative to the body tends to displace the other wheel of the pair relative to the body in the opposite direction in a vertical plane.

3. In a vehicle, a body, a pair of forward and a pair of rear road wheels therefor, the wheels of each pair being on opposite sides of the body, a suspension means between wheels and body comprising a torque-resisting tubular mid-member having its longitudinal axis in the same vertical plane as the longitudinal centerline of the body, a pair of rigid arms extending forwardly and another pair extending rearwardly therefrom and to which arms the body is attached, pivotal wheel mountings permitting relative vertical displacement of wheels and body secured to the body adjacent the point of connection of the respective rigid arms thereto, parts spaced for lateral movement upon the transverse turning-axis of said tubular member, bell cranks each connected at one end with said wheel-mountings and to the body at the other end, and resilient means within said tubular member providing a structure whereby the displacement of one wheel or the adjacent body-part in a vertical plane applies a yielding pressure causing compensating displacements between the other wheels and the respective adjacent body parts, thus tending to maintain the body in a plane normally parallel with the general surface of the road being traversed.

4. In a vehicle, a body, a pair of forward and a pair of rear road wheels for supporting the same, a system of linkages between the wheels and the body including a tubular housing secured to the body and a pair of rotatable elements therewithin respectively connecting diagonally opposed pairs of wheels, said elements and linkages being so arranged that displacement of a wheel or of the body adjacent thereto in a vertical plane causes a compensating displacement of the other wheels and body portions respectively adjacent thereto within the limits of the total linkage action, and means within the housing yieldably resisting the compensating action of the linkages.

5. In a motor vehicle, a chassis, a pair of forward and a pair of rear road wheels therefor, the wheels of each pair being on opposite sides of the chassis, a suspension means between the wheels and the chassis comprising a tubular member having its longitudinal axis in the same vertical plane as the longitudinal center line of the chassis and rigidly attached at its forward and rear ends to the chassis at points respectively adjacent each of the forward and rear wheels, said wheels each being pivotally mounted upon the chassis to move in a vertical plane relative thereto, a pair of rotatable elements within the tubular member rigidly connecting each forward wheel with a rear wheel on the respective opposite side of the chassis, means within the tubular member yieldably resisting rotation of said rotatable elements providing a structure whereby displacement of any one wheel in a vertical plane relative to the chassis applies a yielding pressure to the remaining wheels, tending to displace the same to like degree relative to the body and thus tending to maintain the chassis in a plane parallel to the plane of the road surface being traversed.

6. In a motor vehicle, a chassis, a pair of forward and a pair of rear road wheels therefor, the wheels of each pair being on opposite sides of the chassis, a suspension means between the wheels and the chassis comprising a tubular member having its longitudinal axis in the same vertical plane as the longitudinal center line of the chassis and rigidly attached at its forward and rear ends to the chassis at opposite sides thereof, said wheels each being pivotally connected with the chassis to move in a vertical plane relative thereto, a pair of rotatable elements within the tubular member connecting each forward wheel with a rear wheel on the respective opposite side of the chassis, and means yieldably resisting rotation of said pair of elements, providing a structure whereby displacement of any one wheel in a vertical plane relative to the chassis applies a yielding pressure to the remaining wheels, tending to relatively displace the same to like degree and thus tending to maintain the chassis in a plane parallel to the plane of the road surface being traversed.

7. In a motor vehicle, a chassis, a pair of forward and a pair of rear road wheels therefor, the wheels of each pair being on opposite sides of the chassis, a suspension means between the wheels and the chassis comprising a tubular member having its longitudinal axis in the same vertical plane as the longitudinal center line of the chassis, a pair of arms extending forwardly of the tubular member and a pair of arms extending rearwardly of the tubular member to the chassis and rigidly connecting the tubular member thereto, said wheels each being pivotally connected with the chassis and said suspension means to move in a vertical plane relative to the chassis, a pair of torsion elements within the tubular member each connecting a diagonally paired forward and rear wheel on the respective opposite side of the chassis, and yieldable means in said tubular member resisting displacement of said torsion elements relative to the other and to the tubular member, providing a structure whereby displacement of any one wheel in a vertical plane relative to the chassis applies a yielding pressure to the remaining wheels and tending to displace the same relative to the chassis and thus to maintain the chassis in a plane parallel to the plane of the road surface being traversed.

8. In an automotive vehicle, a body, a pair of front and a pair of rear wheels each pivotally connected to the body to permit relative displacement between the wheels and body, means for maintaining the pivotally supported wheels to movement relative to the body in a vertical plane, a suspension means comprising a member extending longitudinally of the body in fixed relation in the vertical center plane thereof, means carried by the said member having an arm at the forward end pivotally connected with a front wheel mounting and a similar means at the opposite end pivotally connected with the diagonally opposite rear wheel mounting, each of said means connecting the diagonally paired wheels being yieldably supported for rotation and providing a flexible suspension for the body.

CORWIN D. WILLSON.